June 18, 1935.  E. T. FRANZEN ET AL  2,005,616
SOLE AFFIXING MACHINE
Filed Dec. 18, 1929  10 Sheets-Sheet 7
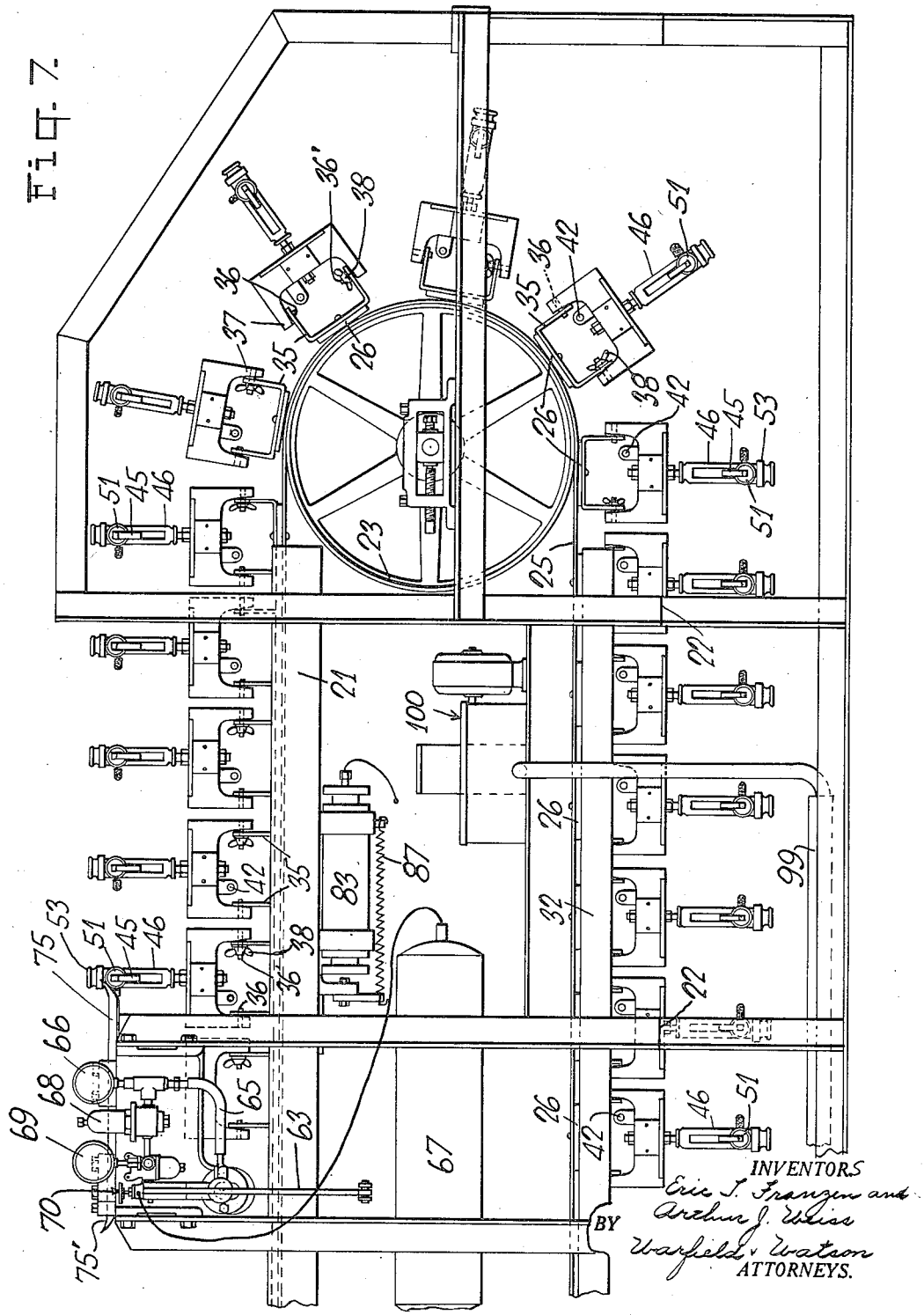

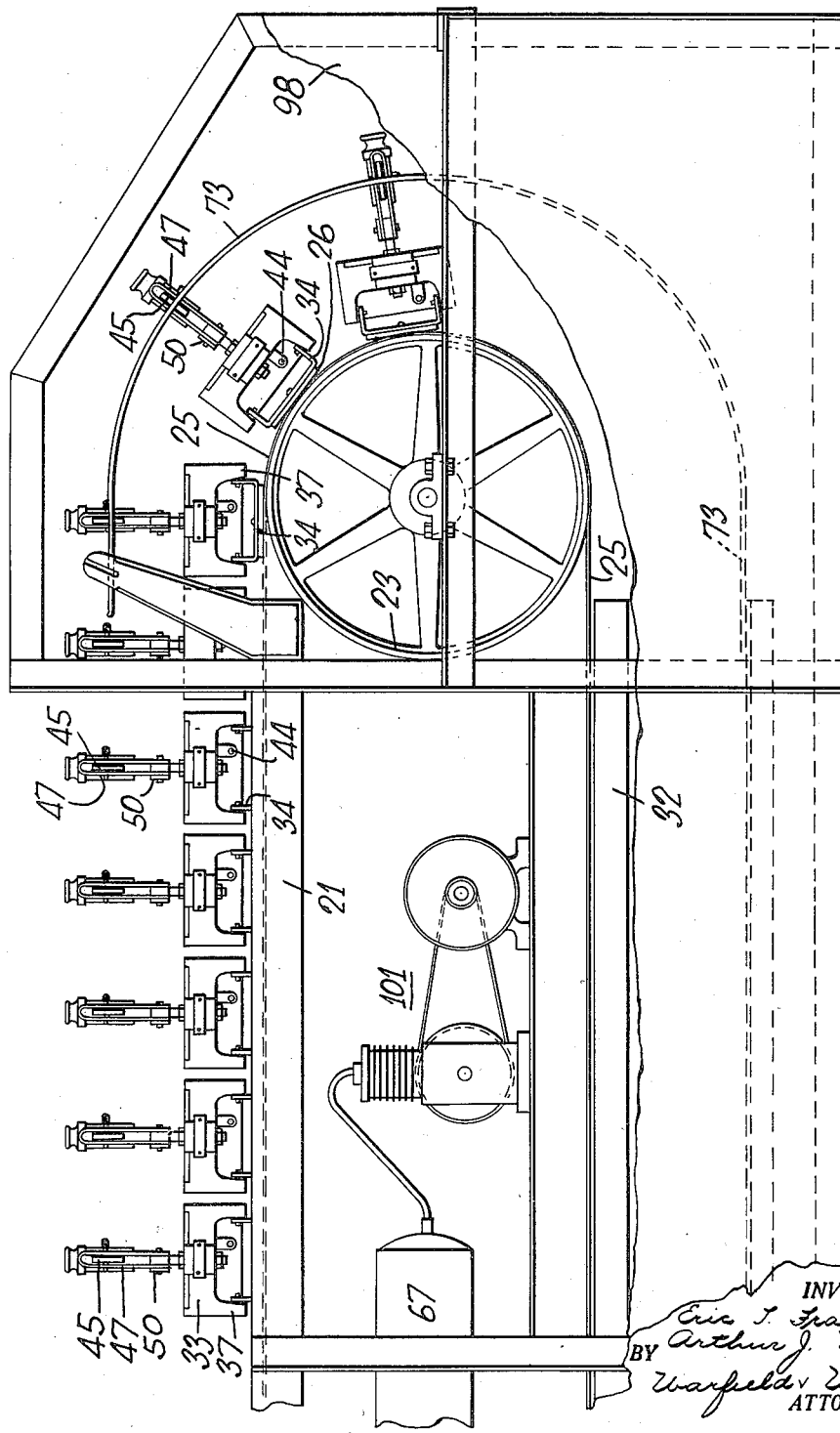

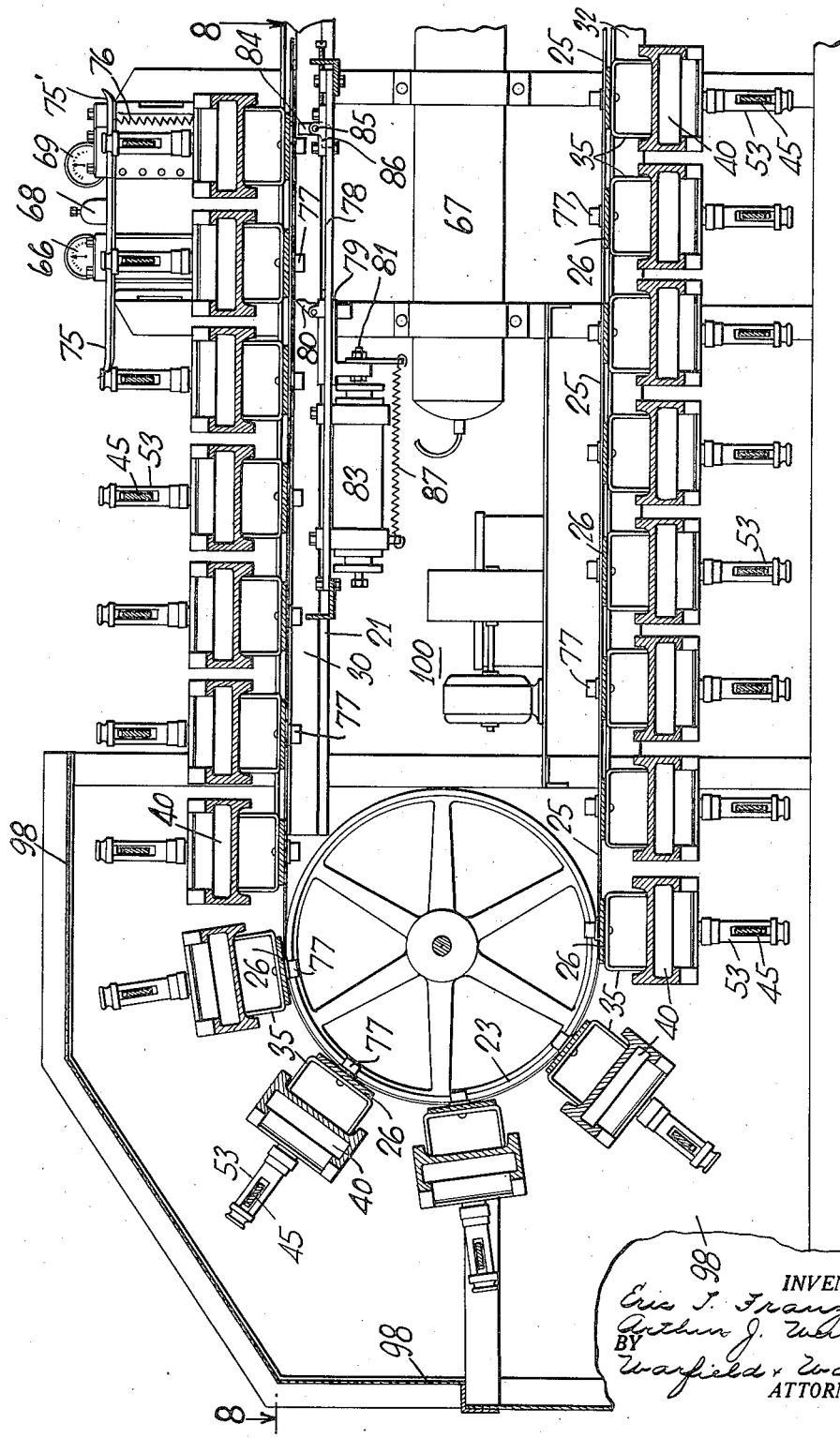

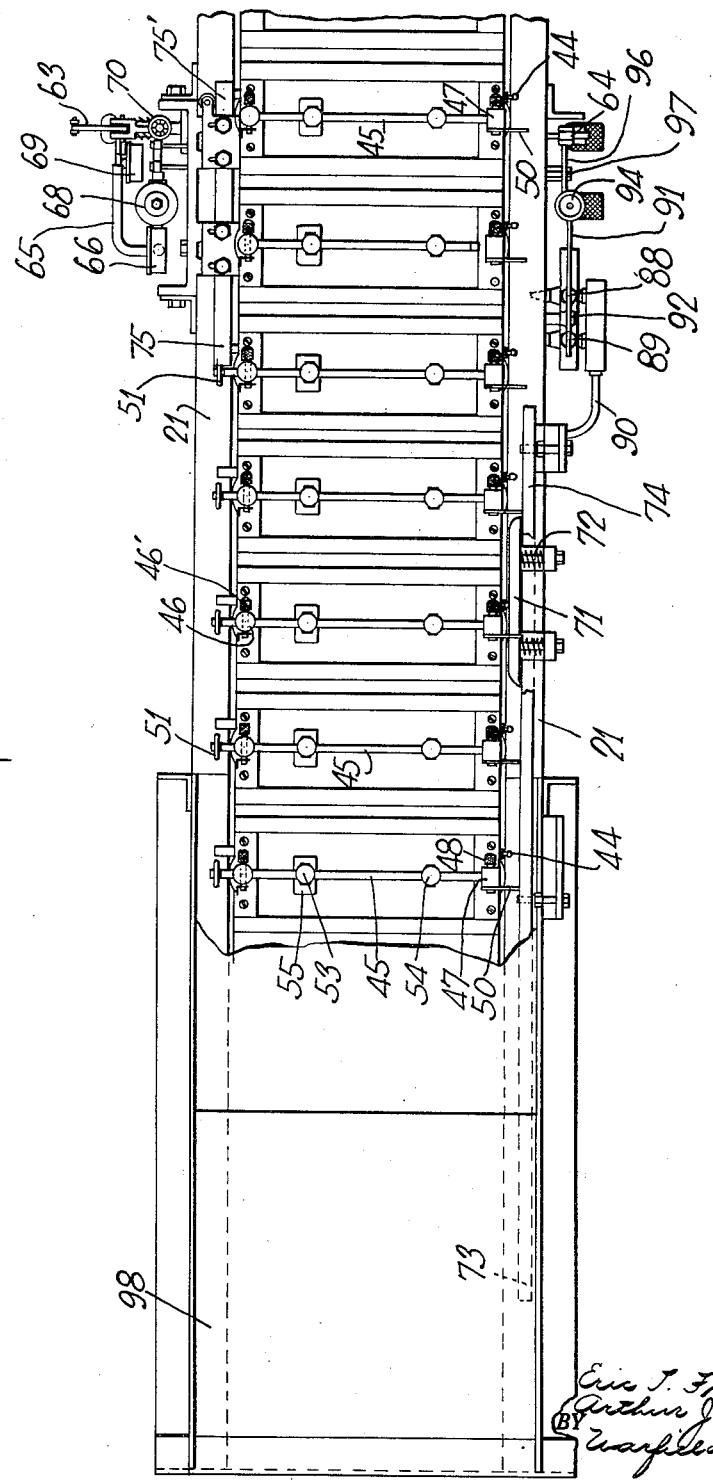

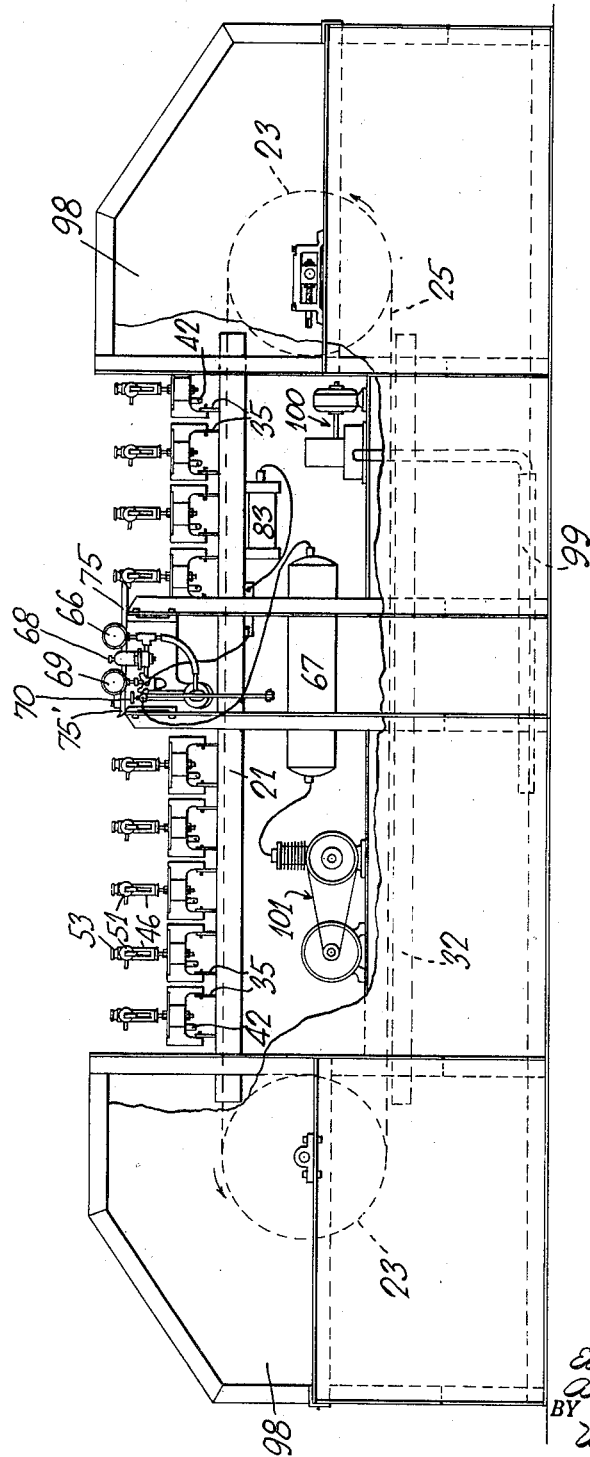

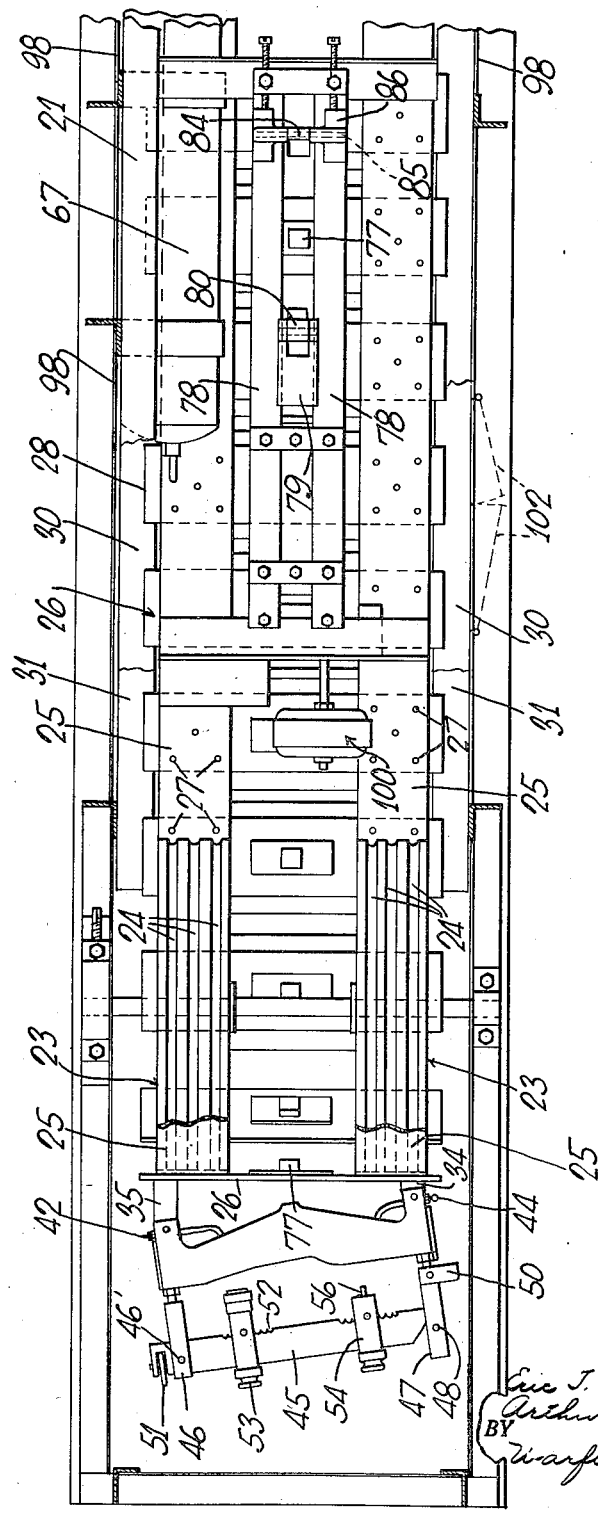

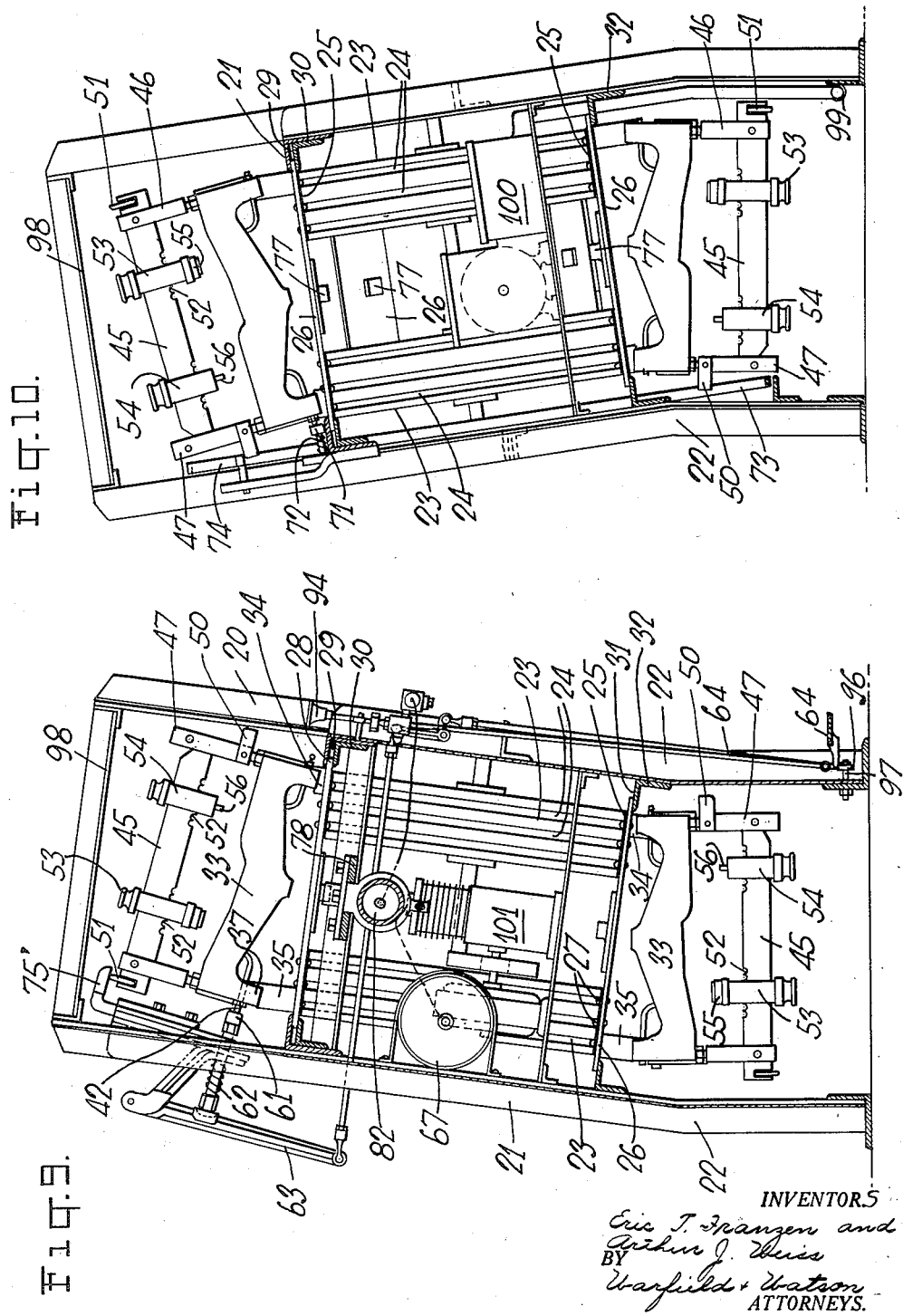

June 18, 1935.  E. T. FRANZEN ET AL  2,005,616
SOLE AFFIXING MACHINE
Filed Dec. 18, 1929  10 Sheets-Sheet 10
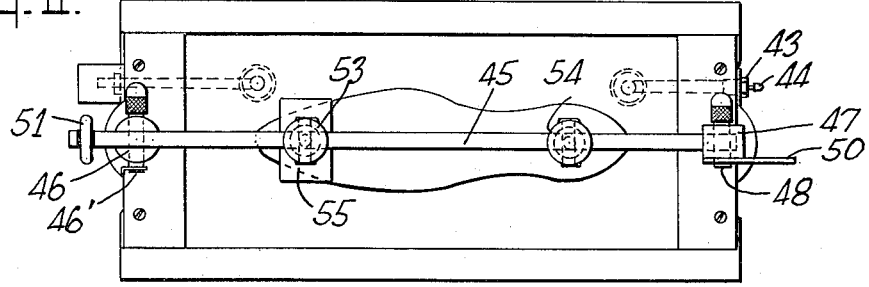
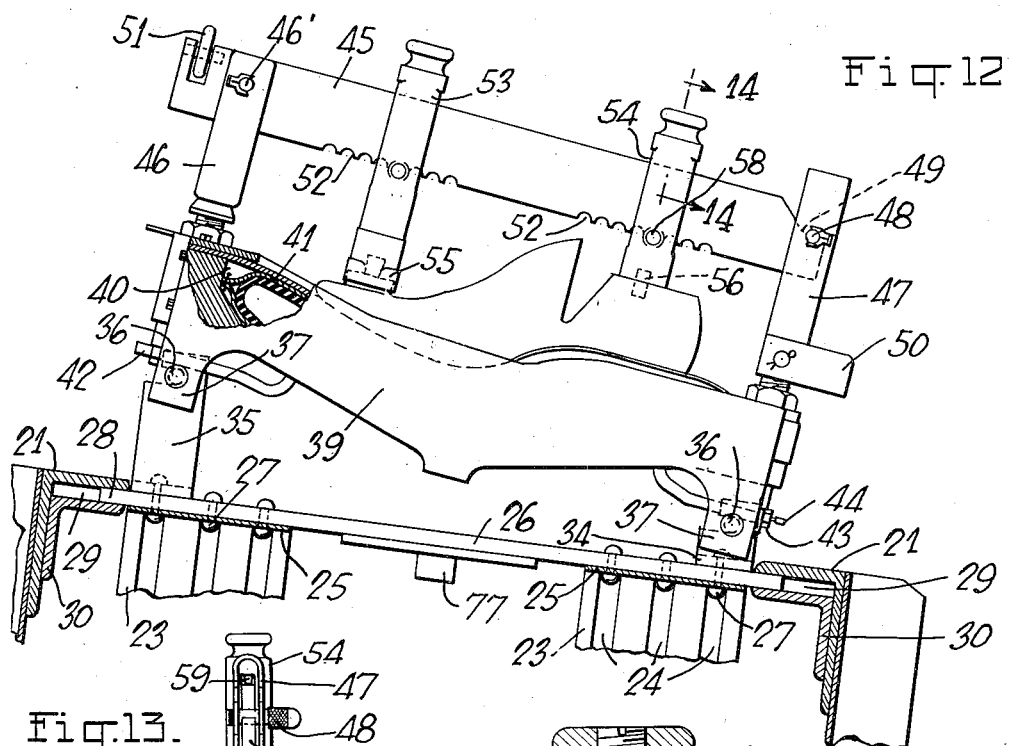
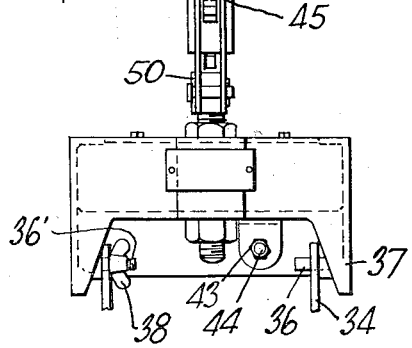
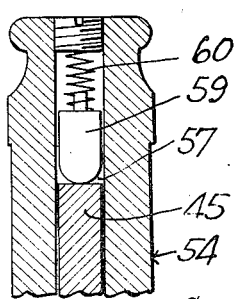
INVENTORS
Eric T. Franzen and
Arthur J. Geiss
BY Warfield & Watson
ATTORNEYS.

Patented June 18, 1935

2,005,616

UNITED STATES PATENT OFFICE 2,005,616

SOLE-AFFIXING MACHINE

Eric T. Franzen, Maplewood, and Arthur J. Weiss, West Orange, N. J., assignors to Compo Shoe Machinery Corporation, New York, N. Y., a corporation of Delaware Application December 18, 1929, Serial No. 414,849

21 Claims. (Cl. 12—36)

This invention relates to apparatus for use in the manufacture of footwear, particularly by those processes in which the sole is adhesively attached to the lasted upper, and, more particularly, to sole-affixing machines of the multiple-press type.

A general object of the invention is to provide an apparatus by which soles may be adhesively affixed in a rapid, efficient and economical manner.

A particular object of the invention is to provide a sole-affixing machine of the multiple-press type which is of simple and sturdy construction and which operates with ease and efficiency, conserving the time and energy of the operator, whereby an increased number of soles may be affixed per unit of time and labor.

A more specific object of the invention is to provide a sole-affixing machine including a carrier and a plurality of shoe presses having inflatable pads and means for clamping a shoe thereagainst, having simple and novel means for intermittently advancing the press carrier and for insuring accurate alignment of each press with the source of fluid pressure supply when the press passes said source.

A further object of the invention is to provide an apparatus including a shoe press which, when in position for loading has its face inclined downwardly toward the operator whereby ready access to the mechanism and an unobstructed view of the loading operation are afforded.

A still further object of the invention is to provide a machine of the class described, including a plurality of shoe presses mounted on a conveyor having an elongated lower traverse, said lower traverse being enclosed and provided with air tempering means whereby the presses loaded with shoes may be subjected to a current of warm air of gradually increasing temperature.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For a fuller understanding of the nature and objects of the invention, reference should be had to the following detailed description taken in connection with the accompanying drawings, in which:

Fig. 3 is similar to Fig. 2 but of the right-hand end of Fig. 1, the two figures if placed together comprising an enlarged view of the machine;

Fig. 4 is a vertical longitudinal sectional view of Fig. 2;

Fig. 5 is a plan view of Fig. 2;

Fig. 6 is a rear elevation corresponding to Fig. 1;

Fig. 7 is an enlarged rear elevation corresponding to Fig. 2;

Fig. 8 is a horizontal sectional view of the left-hand end of the machine taken along the line 8—8 in Fig. 4; looking in the direction of the arrows;

Figs. 9 and 10 are vertical transverse sectional views taken along the line 9—10 in Fig. 2 and looking respectively to the right and left;

Fig. 11 is a plan view of one of the shoe presses;

Fig. 12 is a detailed side elevational view of a press and associated parts of the conveyor;

Fig. 13 is a rear elevation of the press looking from the right of Fig. 11; and, Fig. 14 is an enlarged detailed view taken along the line 14—14 in Fig. 12.

Figure 1:
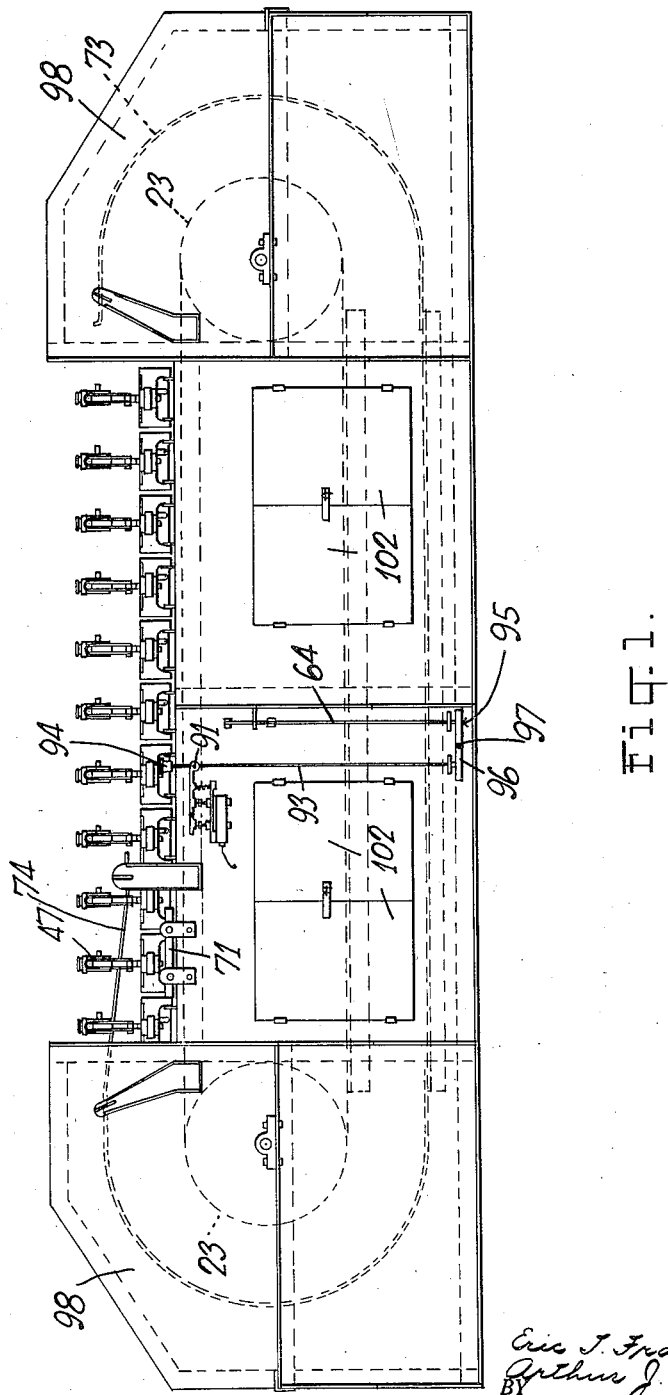
Fig. 1 is a front elevation of a preferred embodiment of the invention.

Considered generally, the present invention includes as novel features an improved type of carrier for sole-affixing presses, a novel manner of positioning the press for the convenience of the operator at the loading station, means for advancing the conveyor intermittently for positioning the successive presses in accurate alignment with a fluid pressure supply source, and means for subjecting the loaded presses for an extended period of time to the action of tempered air in a manner such that the presses gradually advance into a zone of increasing temperature.

Referring more particularly to the drawings, the embodiment shown comprises a pair of spaced elongated front and rear frame members 20 and 21, the bottom edges of which may rest suitably on the floor and the top edges of which stand to a height approximating the waist of the operator. The rear frame member 21 is somewhat higher than the member 20, both having their upper portions disposed at a slight angle to the vertical and preferably having their lower portions bent as at 22 whereby they seat firmly on the floor without the necessity of especially shaped angle brackets.

Mounted between the inclined upward portions of the frame members and toward the ends thereof are opposed pairs of drum wheels 23 which are provided with peripheral grooves 24, and one pair of which is adjustably mounted, as shown at the right of Fig. 6. Over each opposed pair of wheels passes a strap-belt 25, preferably of metallic construction. At regularly spaced intervals on the strap conveyors thus formed are disposed a plurality of transverse cleat members 26 which are riveted thereto with headed rivets 27, the heads of which extend into the grooves 24. The ends of the cleat members 26 extend laterally beyond the strap-belts 25 as at 28, and at the upper traverse of the conveyor ride within grooves 29 formed as for example by angle irons 30, and at the lower traverse of the conveyor ride upon a ledge member 31 formed by an angle iron 32, all conveniently attached to the frame members.

It will thus be seen that there is provided a conveyor having the face of its upper traverse inclined downwardly toward the front of the machine but which is prevented from creeping downwardly from the drum members 23 by means of the gripping action between the rivet heads 27 and the grooves 24, and that the conveyor is relieved of the weight of the shoe presses which are mounted on the cleats 26, as hereinafter described, by means of the grooves 29 and the ledge 31.

Attached to each cleat 26 is a shoe press 33 which is preferably detachably mounted as shown by means of notched U-shaped members 34 and 35 disposed at the ends of the cleats and engaging pin members 36 secured to the downwardly projecting feet 37 of the presses. One of these pin members is preferably threaded as at 36' whereby a wing nut 38 may be screwed thereon to clamp the press securely in position but allowing quick removal. The lugs of the U-shaped member 35 are preferably somewhat longer than those of 34 so that the angle of the face of the shoe presses on the upper traverse may be somewhat more inclined to the horizontal than the face of the conveyor supporting the same, whereas on the lower traverse the presses assume approximately a horizontal position. Variation in the relative height of the two U-shaped members thus allows variation of the inclination of the face of the press for any given machine, and if desired all of the inclination may be obtained by means of the devices by which the presses are attached to the conveyor. It is also to be understood that although the legs 37 are shown on the outside of the U-shaped members 34 and 35, a transposition of the parts may be made or other suitable securing means may be used without departing from the spirit of the invention.

In certain aspects, any suitable type of shoe press may be mounted on the conveyor, but it is preferred that the press shall be of a type having an inflatable pad and means for clamping the shoe thereagainst. A suitable press is shown, for example, in Figs. 11–14, in which there is provided an elongated base member 39 having a cavity 40 therein which conforms generally to the longitudinal contour of a shoe to be clamped in the press and in which is disposed an inflatable pressure pad 41, provided with a forwardly extending nipple 42 containing an inlet valve and a rearwardly extending nipple 43 containing an outlet valve which may be unseated to release the fluid under pressure by means of a plunger member 44. Since air is preferably the pressure fluid which is used, the mechanism will hereinafter be described with reference thereto by way of exemplification.

The press is likewise provided with a clamping member 45 which is pivoted to a post 46 at the forward end as at 46', and is held in shoe clamping position by means of a pivoted bail member 47 at the rear end, having a transverse pin member 48 engaging a notch 49 on the member 45, and also having a rearwardly projecting lug 50 for a purpose hereinafter to be pointed out. Furthermore, the member 45 projects slightly beyond the pivot 46' and carries an anti-friction wheel 51, and on its intermediate portion, which overlies the press, is provided a plurality of spaced notches 52. Riding on said intermediate portion of the member 45 are two depending members 53 and 54, one having an instep pad 55 and the other a last pin 56 at their respective lower ends. Each of the members 53 and 54 is provided with a longitudinal slot 57 through which the member 45 passes, and across which there is, at its lower portion, a transverse pin 58. To insure the engagement of the pin 58 with one of the notches 52, the members 53 and 54 are also each provided with a sliding plunger member 59 which is spring pressed downwardly by means of a mechanism 60, and the lower end of which rests on the top of the member 45.

Adjacent a position on the upper traverse of the conveyor which will hereinafter be referred to as the loading station, the machine is provided with an air pressure supply mechanism in the form of a reciprocable chuck 61 which is normally held in its retracted position by means of a spring 62 and which may be advanced toward and into contact with the inlet nipple 42 of the presses 39 by means of a lever mechanism 63 controlled by a manually operable mechanism preferably of the treadle type such as 64.

The chuck 61 is connected by means of a flexible tube 65 with a pressure gauge 66 which shows the actual pressure introduced into the inflatable pad from the pressure tank 67, and if high pressure be used with a reducing valve 68, a second pressure gauge 69, a high pressure valve 70, and thence to the pressure tank 67.

The machine is likewise provided with an air release cam 71 which operates as the presses approach the loading station. This air release cam is preferably constructed with a resilient mounting, including coil spring members 72, as is shown particularly in Fig. 5. At the end traverses the machine is equipped with guard members 73, which, if a press goes through the machine empty, serve to hold the bail member 47 in an upright position to prevent its entanglement with the frame members of the machine, and at the left end of the machine the guard member 73 on the front is inclined downwardly to provide a cam 74 which, after the release of the air pressure by the cam 71, operates against the rearwardly projecting lugs 50 of the bail members 47 automatically to release the clamping lever 45. Also at the rear of the machine opposite the loading station, it is provided with a third cam member which engages the anti-friction wheel 51 of the clamping lever 45 to raise the clamping lever away from the press. The cam 75 at its right-hand end, which is directly opposite the loading station, is provided with a vertically movable portion 75' which is resiliently held in downward position by means of a spring 76 which normally holds the clamping lever 45 in raised position at the loading station, but which allows the operator to force the clamping lever 45 into clamping position after a shoe has been placed therein.

By means of the present invention, there is provided a simple and efficient means for intermittently advancing the conveyor to present successively the inlet valve of the presses in accurate alignment with the air supply chuck 61. This mechanism is also of the air pressure type and is shown particularly in Figs. 2, 4 and 8. Each of the cleat members 26 is provided with a downwardly depending lug 77 which extends between the conveyor-belts 25 and adjacent a pair of parallel track members 78 between which is mounted a reciprocable head 79 carrying a pivoted latch member 80 which is adapted to engage the lugs 77 upon movement to advance the conveyor and to pass by the lugs upon the return movement. The reciprocable head 79 is secured to the piston rod 81 of a piston 82 which acts within a pressure cylinder 83. The extent of the advancing stroke of the piston 82 and the pivoted latch member 80 is limited by an L-shaped stop member 84 which is pivoted at 85 on an adjustable head 86 and which has a vertical and a horizontal leg. As the reciprocable head 79 and the pivoted latch 80 advance a particular lug 77, the head 79 engages the horizontal leg of the stop member 84 and thereby holds the vertical leg in position to form a rigid stop against which the lug is pushed. The reciprocable head 79 is returned to its original position by suitable means such as a tension spring 87, and at such time contact of the horizontal leg therewith is broken, and as the latch and reciprocable head advance another lug the previously mentioned lug passes by the vertical leg of the stop member 84, due to the rocking action thereof on the pivot 85.

In order to actuate the conveyor advancing mechanism with minimum time and energy of the operator, the air supply and release to and from the pressure cylinder 83 is controlled by means of a pair of valves 88 and 89 which are connected through the tube 90 to the left end of the pressure cylinder 83, whereby depression of the valve 88 will project the reciprocable head 79 to advance the conveyor, and depression of the valve 89 will release the air pressure and allow the spring 87 to retract the reciprocable head 79. More particularly, the valves 88 and 89 are preferably controlled by means of a rocking arm 91 pivoted at a point 92 between the valves, which arm is in turn pivotally attached to a rod at 93 which extends upwardly a short distance to provide a manual control handle 94, and downwardly to a treadle 95 which is preferably connected by means of a bar 96 to the treadle 64, which bar has a pivot 97 located between the two treadles so that as the treadle 64 is depressed to advance the air chuck and inflate the pressure pad of the given press, the rod 93 is raised and the valve 89 is opened, and as the treadle 95 is depressed the treadle 64 is raised to withdraw the chuck 61 from engagement with the air inlet nipple and the valve 88 is opened to project the reciprocable head 79 and advance the conveyor.

Finally, in the preferred construction as shown, the frame members 20 and 21 are enclosed by sheet metal plates 98, and particularly the lower traverse of the conveyor is thus enclosed so that heated air can be introduced thereinto through a perforated pipe 99 from a fan and heating chamber assembly 100. The motor for this fan, as well as the air compressor assembly 101 and the motor therefor may conveniently be located between the traverses of the conveyor, thereby providing a machine which may be readily installed or moved from one position to another with only the necessity of providing a plug for electric power connection. For servicing of these assemblies the casing is preferably provided with one or more doors 102.

Figure 2:
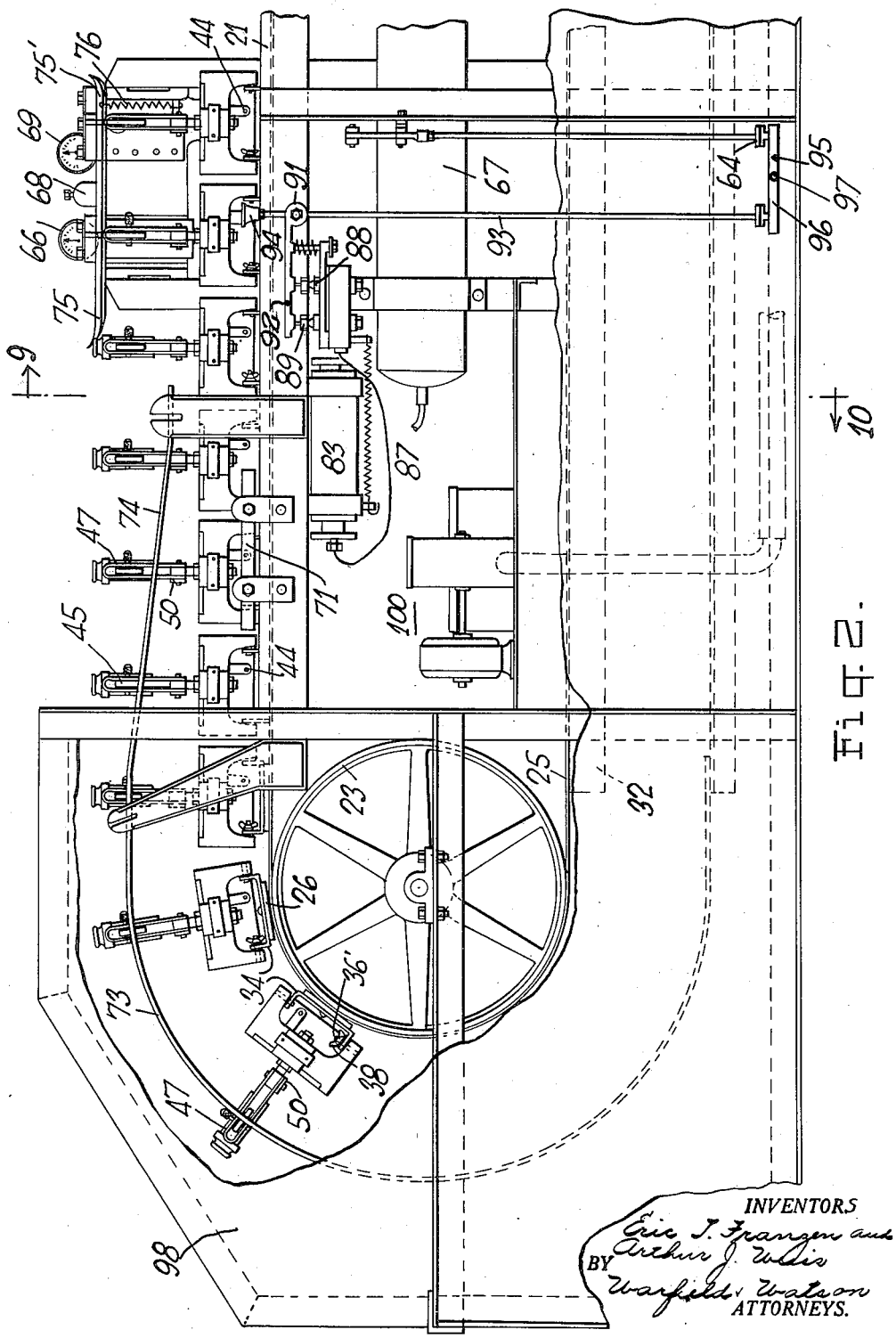
Fig. 2 is an enlarged view of the left-hand end of Fig. 1, parts being broken away for convenience of disclosure.

It will thus be readily apparent to one skilled in the art that in accordance with the principles of the present invention, there has been provided a machine which is of simple construction and efficient in operation, particularly in that it may be readily serviced and operated and in which the loaded presses are gradually subjected to the action of tempered air of a gradually increasing temperature, and thereafter, as is shown particularly in Fig. 2, are slowly removed from the zone of maximum temperature, whereby they have cooled somewhat by the time they reach a position immediately preceding the loading station where the clamping pressure is removed therefrom.

It is also to be understood that certain of the features of the present invention may be utilized in connection with various types of presses used in the manufacture and repair of footwear, as well as with various types of press carriers heretofore suggested for use in machines of the multiple-press type. Therefore, it is for reasons of convenience and simplicity that the illustrated embodiment of the invention has been confined to a preferred type of carrier and to the gas-pressure type of press. It is to be understood, however, that the invention is not limited to these features or to the use in sole-affixing machines as distinguished from sole-laying or sole-leveling machines, and since certain changes may be made in the above construction, and different embodiments of the invention could be made, without departing from the scope thereof, it is intended that all matter contained in the above description or shown in the accompanying drawings shall be interpreted as illustrative and not in a limiting sense.

It is further to be understood that the following claims are intended to cover all of the generic and specific features of the invention herein described, and all statements of the scope of the invention which as a matter of language might be said to fall therebetween.

Having described our invention, what we claim as new and desire to secure by Letters Patent, is:

1. In combination, a shoe press having a pad, means for clamping a shoe thereagainst, and supporting means for said press comprising a flexible elongate conveyor means for holding said press in loading position with its face downwardly inclined toward the operator, a portion of said angle of inclination being due to an inclined surface on the supporting means and the remainder thereof being due to the formation of the press.

2. In a machine of the class described, in combination, a carrier comprising a flexible elongated conveyor, a plurality of shoe presses mounted on said carrier and adapted to be moved past a loading station thereby, each of said presses including a pad and means for clamping a shoe thereagainst, means at said station for increasing pressure in said pad, said carrier being so formed that it presents each shoe press at the loading station with the pad, and clamping means of the press downwardly inclined toward the operator, and means for arresting each press at a precise point at the loading station in registry with said pressure increasing means.

3. In a machine of the class described, in combination, a pair of spaced, tilted drums, a conveyor mounted thereon, a plurality of shoe presses carried by said conveyor and adapted to be moved through a circuitous path thereby, each of said presses including a pad and means for clamping a shoe against said pad, the upper traverse of said conveyor being inclined from the horizontal toward the front side of the machine whereby the pads and clamping means of the presses are readily accessible to the operator, and interfitting means on said drums and conveyor to prevent transverse shifting of the latter.

4. In a machine of the class described, in combination, a flexible conveyor having upper and lower horizontal traverses inclined to the horizontal toward the front of the machine, a plurality of shoe presses mounted on said conveyor, each of said shoe presses including a pad and means for clamping a shoe against said pad, said presses being mounted at an additional angle to the traverses of the conveyor whereby the presses on the upper traverse are inclined conveniently toward the operator and the presses on the lower traverse are in substantially horizontal position.

5. In a machine of the class described, in combination, a pair of opposed upstanding frame members having at least a portion of their length inclined to the vertical and toward the front of the machine, spaced parallel drum members mounted between and inclined with the inclined portions of said frame members, a flexible conveyor mounted around said drums, and a plurality of shoe presses mounted on said flexible conveyor.

6. In a machine of the class described, in combination, a pair of opposed upstanding elongated frame members, said frame members being inclined from the vertical and toward the front of the machine at their upper portions, spaced drum members mounted between and inclined with the inclined portions of said frame members and toward the ends thereof, a flexible conveyor passing around said drum members, a plurality of transverse cleats connected at spaced intervals to said flexible conveyor, opposed groove members mounted on the said frame members adjacent the upper traverse of the conveyor and slidably engaging the ends of said cleat members, opposed ledge members similarly located adjacent the lower traverse of the conveyor and upon which the ends of the cleats ride, and a shoe press mounted on each of said cleats.

7. In a machine of the class described, in combination, a pair of opposed upstanding elongated frame members, said frame members being inclined from the vertical and toward the front of the machine at their upper portions, a pair of spaced drum members mounted between and inclined with the inclined portions of said frame members and at each end thereof, conveyor straps passing around each of the opposed drum members to form a double strap conveyor, a plurality of transverse cleats connected at spaced intervals across said straps and having their ends extending beyond the outer sides thereof, opposed groove members mounted on the said frame members adjacent the upper traverse of the conveyor and slidably engaging the ends of said cleat members, opposed ledge members similarly located adjacent the lower traverse of the conveyor and upon which the ends of the cleats ride, and a shoe press mounted on each of said cleats.

8. In a machine of the class described, in combination, a pair of opposed upstanding elongated frame members, said frame members being inclined from the vertical and toward the front of the machine at their upper portions, a pair of spaced drum members mounted between the inclined portions of said frame members and at each end thereof, conveyor straps passing around each of the opposed drum members to form a double strap conveyor, a plurality of transverse cleats riveted at spaced intervals across said straps and having their ends extending beyond the outer sides thereof, opposed groove members mounted on the said frame members adjacent the upper traverse of the conveyor and slidably engaging the ends of said cleat members, opposed ledge members similarly located adjacent the lower traverse of the conveyor and upon which the ends of the cleats ride, and a shoe press mounted on each of said cleats, said drum members being provided with peripheral grooves to accommodate the rivet heads.

9. In a machine of the class described, in combination, a conveyor, said conveyor including opposed pairs of spaced tilted drum members, a strap passing over each of said opposed pairs, a plurality of cleats riveted to and extending transversely between said straps at spaced intervals, and a shoe press mounted on each of said cleats, said drum members being provided with peripheral grooves to accommodate the rivet heads.

10. In a machine of the class described, in combination, a conveyor, said conveyor including opposed pairs of spaced drum members, a strap passing over each of said opposed pairs, a plurality of cleats secured to and extending transversely between said straps at spaced intervals, a lug at each end of each cleat, and a shoe press connected to each pair of said lugs, one of each pair of lugs being of greater height than the other whereby the press is inclined with respect to the conveyor.

11. In a machine of the class described, in combination, a conveyor, said conveyor including opposed pairs of spaced drum members, a strap passing over each of said opposed pairs, a plurality of cleats secured to and extending transversely between said straps at spaced intervals, a U-shaped member at each end of each cleat providing spaced upwardly extending lugs, a shoe press having downwardly disposed lugs positioned to fit outside of said lugs, a notch in each of said upwardly extending lugs, and a pin on each of said downwardly extending lugs cooperating with said notches to hold the press securely attached to the cleats.

12. In a machine of the class described, in combination, a conveyor, said conveyor including opposed pairs of spaced drum members, a strap passing over each of said opposed pairs, a plurality of cleats secured to and extending transversely between said straps at spaced intervals, a U-shaped member at each end of each cleat providing spaced upwardly extending lugs, a shoe press having downwardly disposed lugs positioned to fit outside of said lugs, a notch in each of said upwardly extending lugs, a pin on each of said downwardly extending lugs cooperating with said notches to hold the press securely attached to the cleats, and clamping means on one of said pins for clamping the lugs together at one point, one of said U-shaped members of each pair having arms of greater length than the other.

13. In a machine of the class described, in combination, a carrier, a plurality of shoe presses mounted at evenly spaced intervals on said carrier and adapted to be moved through a circuitous path thereby, each of said presses including an inflatable pad having an inlet valve and means for clamping a shoe against said pad, a plurality of lugs associated with the conveyor at spaced intervals corresponding to the shoe presses, a fluid pressure supply mechanism adjacent the path of said inlet valves, means for moving said mechanism into contact with said valves, and means for accurately aligning said inlet valves successively with said fluid pressure supply mechanism, said last mentioned means including an air plunger mechanism for operating successively against the lugs to force each thereof firmly against a positive stop.

14. In a machine of the class described, in combination, a flexible conveyor, a plurality of shoe presses mounted at evenly spaced intervals on said conveyor and adapted to be moved through a circuitous path thereby, means to tighten said conveyor, each of said presses including an inflatable pad having an inlet valve and means for clamping a shoe against said pad, a plurality of lugs associated with the conveyor at spaced intervals corresponding to the shoe presses, a fluid pressure supply mechanism adjacent the path of said inlet valves, means for moving said mechanism into contact with said valves, means for accurately aligning said inlet valves successively with said fluid pressure supply mechanism, said last mentioned means including an air plunger mechanism for operating successively against the lugs to force each thereof firmly against a positive stop, and means for adjusting said positive stop along the conveyor.

15. In a machine of the class described, in combination, a carrier having a plurality of evenly spaced lugs associated therewith and a carrier-advance mechanism including a reciprocable fluid pressure cylinder and piston, a reciprocating head connected to said piston, a pivoted latch member carried by said head and adapted to engage said lugs when moved in one direction and pass thereby in the other direction, and a positive stop toward the outer end of the movement of the reciprocating head against which said lugs are forced by said latch.

16. In a machine of the class described, in combination, a carrier having a plurality of evenly spaced lugs associated therewith and a carrier-advance mechanism including a reciprocable fluid pressure cylinder and piston, a reciprocating head connected to said piston, a pivoted latch member carried by said head and adapted to engage said lugs when moved in one direction and pass thereby in the other direction, and a positive stop toward the outer end of the movement of the reciprocating head against which said lugs are forced by said latch, said positive stop comprising a pivoted L-shaped member having a vertical leg which forms the stop and a horizontal leg against which the reciprocating head abuts as the lug is forced against the vertical leg.

17. In a machine of the class described, in combination, a carrier having a plurality of evenly spaced lugs associated therewith and a carrier-advance mechanism including a reciprocable fluid pressure cylinder and piston, a reciprocating head connected to said piston, a pivoted latch member carried by said head and adapted to engage said lugs when moved in one direction and pass thereby in the other direction, a positive stop toward the outer end of the movement of the reciprocating head against which said lugs are forced by said latch, said positive stop comprising a pivoted L-shaped member having a vertical leg which forms the stop and a horizontal leg against which the reciprocating head abuts as the lug is forced against the vertical leg, and means for introducing pressure fluid selectively to either end of the pressure cylinder to reciprocate said head.

18. In a machine of the class described, in combination, a carrier having a plurality of evenly spaced lugs associated therewith and a carrier-advance mechanism including a reciprocable fluid pressure cylinder and piston, a reciprocating head connected to said piston, a pivoted latch member carried by said head and adapted to engage said lugs when moved in one direction and pass thereby in the other direction, a positive stop toward the outer end of the movement of the reciprocating head against which said lugs are forced by said latch, said positive stop being released as the reciprocating head moves in the other direction to allow the aforesaid lug to pass as the next lug is advanced by the latch and stopped by the stop, valve means including a double valve for selectively introducing pressure fluid to the pressure cylinder to reciprocate said head and for releasing said pressure, and a rocking arm positioned over said valve means whereby as the arm is rocked in one direction one valve is opened to admit pressure to the cylinder and as it is rocked in the other direction the other valve is opened to release the pressure.

19. In a machine of the class described, in combination, a carrier having a plurality of evenly spaced lugs associated therewith and a carrier-advance mechanism including a reciprocable fluid pressure cylinder and piston, a reciprocating head connected to said piston, a pivoted latch member carried by said head and adapted to engage said lugs when moved in one direction and pass thereby in the other direction, a positive stop toward the outer end of the movement of the reciprocating head against which said lugs are forced by said latch, said positive stop being released as the reciprocating head moves in the other direction to allow the aforesaid lug to pass as the next lug is advanced by the latch and stopped by the stop, valve means including a double valve for selectively introducing pressure fluid to the pressure cylinder to reciprocate said head for releasing said pressure, a rocking arm positioned over said valve means whereby as the arm is rocked in one direction one valve is opened to admit pressure to the cylinder and as it is rocked in the other direction the other valve is opened to release the pressure; said carrier having a plurality of shoe presses mounted thereon and corresponding in number and position to the lugs, each of said presses including an inflatable pad having an inlet valve and means for clamping a shoe thereagainst, a fluid pressure supply chuck disposed adjacent the path of said inlet valves and at a position aligned with one of the presses at the time a lug is forced against the said positive stop, and means for moving said chuck to operative position with the air inlet valve and to inflate the pad of said press, said means being operatively connected to said rocking arm simultaneously to open the piston pressure releasing valve.

20. In a machine of the class described, in combination, a carrier having a plurality of evenly spaced lugs associated therewith and a carrier-advance mechanism including a reciprocable fluid pressure cylinder and piston, a reciprocating head connected to said piston, means for normally urging said reciprocating head to retracted position, a pivoted latch member carried by said head and adapted to engage said lugs when moved in one direction and pass thereby in the other direction, a positive stop toward the outer end of the movement of the reciprocating head against which said lugs are forced by said latch, said positive stop being released as the reciprocating head moves in the other direction to allow the aforesaid lug to pass as the next lug is advanced by the latch and stopped by the stop, valve means including two valves for selectively introducing pressure fluid to the pressure cylinder to reciprocate said head and for releasing said pressure, a rocking arm positioned over said valves whereby as the arm is rocked in one direction one valve is opened to admit pressure to the cylinder and as it is rocked in the other direction the other valve is opened to release the pressure; said carrier having a plurality of shoe presses mounted thereon and corresponding in number and position to the lugs, each of said presses including an inflatable pad having an inlet valve and means for clamping a shoe thereagainst, a fluid pressure supply chuck disposed adjacent the path of said inlet valves and at a position aligned with one of the presses at the time a lug is forced against the said positive stop, treadle operated means for moving said chuck to operative position with the air inlet valve and to inflate the pad of said press, and a second treadle means connected to said rocking arm to actuate said pressure cylinder valves, said treadle means being operatively connected to each other whereby as the first mentioned treadle means is pressed downwardly the first mentioned valve is opened to release the piston pressure and allow the reciprocating head to be returned to normal position and when the second mentioned treadle means is pressed downwardly the chuck will be withdrawn from the inlet valve of the press and the other valve will be opened by the rocking arm to advance said reciprocating head.

21. The combination as claimed in claim 20 in which the two treadle means are located at the opposite ends of a pivoted bar.

ERIC T. FRANZEN.
ARTHUR J. WEISS.